Figure 1:
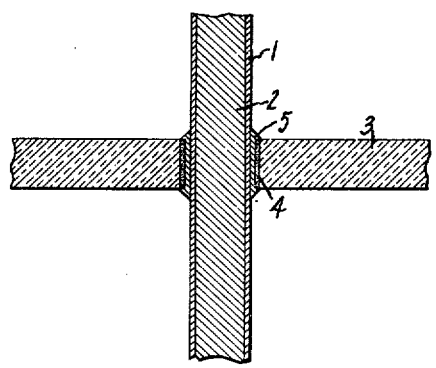

June 20, 1939.   H. PULFRICH   2,163,408
VACUUM-TIGHT SEAL
Filed Nov. 22, 1937

Inventor:
Hans Pulfrich,
by Harry E. Dunham
His Attorney.

Patented June 20, 1939

2,163,408

UNITED STATES PATENT OFFICE 2,163,408

VACUUM-TIGHT SEAL

Hans Pulfrich, Berlin-Friedenau, Germany, assignor to General Electric Company, a corporation of New York Application November 22, 1937, Serial No. 175,958
In Germany November 30, 1936

4 Claims. (Cl. 49—81)

The present invention relates to vacuum-tight seals between bodies having different thermal expansion coefficients. It is especially concerned with, and has as a main object to provide certain improvements and modifications in the art of forming vacuum-tight seals between solid, inorganic electrically insulating bodies, for example ceramic bodies, and solid, electrically conducting bodies, for instance metallic bodies.

Attempts to join bodies having different thermal expansion coefficients, for example ceramic and metallic parts, are generally attended with considerable difficulties. In making metal-to-ceramic junctions it has been customary to use a glass flux or paste, or glazing material, between the parts. However, such substances not only impair the electrical properties of ceramic materials, but render the junctions sensitive to temperature effects. Under temperature changes the mechanical strength, particularly the tensile strength, of an intermediate layer of glazing material is effected.

In my co-pending application Serial No. 166,902, filed October 1, 1937, and assigned to the same assignee as the present invention, a method of making a vacuum-tight joint between metal and ceramic parts, without the usual glazing, is described. In accordance with the invention therein disclosed and claimed, a metal powder of high melting point is spread on the ceramic body, and is sintered or cemented to the body at a temperature higher than the fusion point of the eutectic solid solution having the lowest fusion point in the ceramic body. A ceramic material so metallized then may be soldered to metal.

In the co-pending application of Hans Pulfrich and Richard Magner, Serial No. 175,960, filed concurrently herewith, certain improvements and modifications in the invention described in the earlier filed Pulfrich application were disclosed and claimed. In the aforementioned Pulfrich and Magner application the desirability of using a ceramic body containing oxide of the class consisting of titanium oxide, zirconium oxide, hafnium oxide and thorium oxide, when making a seal in accordance with the broad principles set forth in my aforementioned application Serial No. 166,902, was described. In my co-pending application Serial No. 175,959, filed concurrently herewith, I disclosed and claimed specific means for making a vacuum-tight seal between a ceramic body and a metallic conductor passing through an opening in such body, utilizing principles described in Pulfrich and Magner application Serial No. 175,960 and my application Serial No. 175,959, both of which applications are assigned to the same assignee as the present invention.

Figure 2:
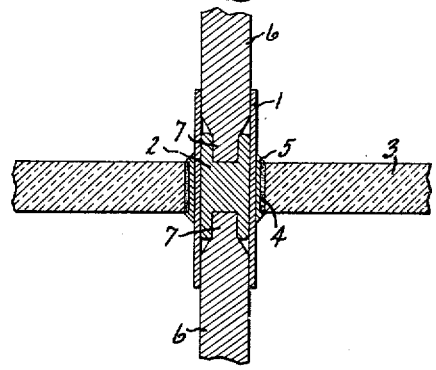

The novel features of the present invention are set forth in the appended claims. The invention itself, however, will be understood most readily from the following description when considered in connection with the accompanying drawing. In this drawing Fig. 1 is a cross-sectional view of a composite structure (broken off in parts), which illustrates the present invention, and, more particularly, illustrates a novel arrangement for conducting current through the walls of electric discharge devices and for forming a vacuum-tight seal between the electrically conducting and insulating members. Fig. 2 is a similar view illustrating another embodiment of the invention.

At points where current conductors pass through the walls of electric lamps and electric discharge receptacles, leaks often occur when such devices are subjected to wide temperature changes. This is especially true in the case of lamps and discharge receptacles the walls of which consist wholly or partly of ceramic substances, since metallic conductors do not adhere tightly to ceramic materials and such materials are very susceptible to traction.

In accordance with the present invention such difficulties are obviated by passing a thin-walled flexible metal tube 1, filled throughout all or a part of its length with a solid, yieldable, electrically conducting material 2, through an opening in a solid, inorganic insulating body 3. In all cases at least that portion of the tube 1, the walls of which are to be sealed to the body 3, is filled with the conducting material 2. The conducting material 2 may comprise such metals as, for example, silver, lead or soft solder. The tube 1 may be formed, for instance, of tungsten, molybdenum or iron-nickel alloy. Advantageously this tube is made of a material having a smaller thermal expansion coefficient than the adjoining wall portion of the insulating body 3.

When the body 3 in its entirety, or the side walls of the opening therein, is formed of a substance that is not effectively wetted by solder, for example of a ceramic substance, then a thin layer 4 of powdered refractory metal, for instance, tungsten, molybdenum, rhenium or the like, is anchored or adhesively held in the surfaces of the side walls of the opening. A mass of solder 5 then bonds or unites the tube 1 with the layer 4 and forms a vacuum-tight seal between said tube and the body 3. When the insulating body 3 is one that is effectively wetted by solder, then the layer 4 sometimes may be omitted. The body 3 advantageously may be a ceramic material which contains oxide of the class consisting of titanium oxide, zirconium oxide, hafnium oxide and thorium oxide, as more fully set forth in the co-pending Pulfrich and Magner application Serial No. 175,960. The layer 4 is formed in such manner that the individual metallic grains are only loosely connected with each other. The way in which this layer is formed is described more fully in the aforementioned Pulfrich and Magner application, and in my previously mentioned co-pending applications Serial No. 166,902 and Serial No. 175,959.

Solder 5 may be hard solder or soft solder, but preferably is one having characteristics such as described more fully in the co-pending applications referred to in the preceding paragraph. Silver or alloys containing silvers, for example silver-copper-nickel alloys, are examples of solders which may be used in carrying this invention into effect.

In case the conducting material 2 melts during the soldering operation, or if it is of such melting point that it melts during service use of a device containing the described structure, it is expedient to close the ends of the tube 1, for example by pinching or stoppering the tube ends. The stoppers may be formed of conducting or of non-conducting materials depending upon the particular application of the structure.

Fig. 2 illustrates an arrangement wherein the ends of the tubes are stoppered. As shown in this figure plugs or stoppers 6 close the ends of the tube 1. For purpose of illustration these stoppers are shown as being formed of metal. These stoppers have coextensive, constricted inwardly directed extensions 7 which are rigidly held by the solid, yieldable electrically conducting material 2. Both the tube 1 and the stoppers 6 (if used) preferably should be made of metal which does not form an alloy with the conducting material 2. If either the tube or the stoppers are made of metals that alloy with the conducting material within the tube, then it is advantageous to provide the inside of the tube with a coating which hinders the formation of such alloy.

What I claim as new and desire to secure by Letters Patent of the United States is:

1. In combination, a solid, a solid inorganic electrically insulating body, an electrical conductor comprising a thin-walled flexible metal tube passing through an opening in said body and a mass of solid yieldable electrically conducting material filling at least that portion of said tube the walls of which are to be sealed to said body, and a mass of metal forming a vacuum-tight seal between said conductor and said body.

2. In an article of manufacture, the combination of a ceramic body, an electrical conductor comprising a thin-walled metal tube passing through an opening in said body and a mass of solid yieldable electrically conducting material filling at least that portion of said tube the walls of which are to be sealed to said body, a thin layer of powdered refractory metal anchored in the ceramic side walls of the opening in said ceramic body, and a mass of solder bonding said metal tube with said layer of refractory metal and forming a vacuum-tight seal between said conductor and said ceramic body.

3. In an article of manufacture, the combination of a ceramic body, an electrical conductor comprising a thin-walled flexible tube formed of iron-nickel alloy passing through an opening in said body and a mass of solid yieldable electrically conducting material filling at least that portion of said tube the walls of which are to be sealed to said body, a thin layer of powdered tungsten adhesively held in the ceramic side walls of the opening in said ceramic body, and a mass of solder uniting said metal tube with said tungsten layer and sealing said conductor to said body.

4. In an article of manufacture, the combination of a ceramic body, an electrical conductor comprising a thin-walled flexible metal tube passing through an opening in said body, a mass of solid yieldable metal filling at least that portion of said tube the walls of which are to be sealed to said body and metallic plugs sealing the openings of said tube, said plugs having coextensive constricted inwardly directed extensions rigidly held by said yieldable metal, and a mass of metal forming a vacuum-tight seal between said conductor and said body.

HANS PULFRICH.

---

CERTIFICATE OF CORRECTION.

Patent No. 2,163,408.　　　　　　　　　　　　June 20, 1939.

HANS PULFRICH.

It is hereby certified that error appears in the printed specification of the above numbered patent requiring correction as follows: Page 2, second column, line 3, claim 1, for the words "a solid, a solid inorganic" read a solid inorganic; and that the said Letters Patent should be read with this correction therein that the same may conform to the record of the case in the Patent Office.

Signed and sealed this 1st day of August, A. D. 1939.

(Seal)　　　　　　　　　　　　　　　　Henry Van Arsdale,
　　　　　　　　　　　　　　　　　Acting Commissioner of Patents.

3 is one that is effectively wetted by solder, then the layer 4 sometimes may be omitted. The body 3 advantageously may be a ceramic material which contains oxide of the class consisting of titanium oxide, zirconium oxide, hafnium oxide and thorium oxide, as more fully set forth in the co-pending Pulfrich and Magner application Serial No. 175,960. The layer 4 is formed in such manner that the individual metallic grains are only loosely connected with each other. The way in which this layer is formed is described more fully in the aforementioned Pulfrich and Magner application, and in my previously mentioned co-pending applications Serial No. 166,902 and Serial No. 175,959.

Solder 5 may be hard solder or soft solder, but preferably is one having characteristics such as described more fully in the co-pending applications referred to in the preceding paragraph. Silver or alloys containing silvers, for example silver-copper-nickel alloys, are examples of solders which may be used in carrying this invention into effect.

In case the conducting material 2 melts during the soldering operation, or if it is of such melting point that it melts during service use of a device containing the described structure, it is expedient to close the ends of the tube 1, for example by pinching or stoppering the tube ends. The stoppers may be formed of conducting or of non-conducting materials depending upon the particular application of the structure.

Fig. 2 illustrates an arrangement wherein the ends of the tubes are stoppered. As shown in this figure plugs or stoppers 6 close the ends of the tube 1. For purpose of illustration these stoppers are shown as being formed of metal. These stoppers have coextensive, constricted inwardly directed extensions 7 which are rigidly held by the solid, yieldable electrically conducting material 2. Both the tube 1 and the stoppers 6 (if used) preferably should be made of metal which does not form an alloy with the conducting material 2. If either the tube or the stoppers are made of metals that alloy with the conducting material within the tube, then it is advantageous to provide the inside of the tube with a coating which hinders the formation of such alloy.

What I claim as new and desire to secure by Letters Patent of the United States is:

1. In combination, a solid, a solid inorganic electrically insulating body, an electrical conductor comprising a thin-walled flexible metal tube passing through an opening in said body and a mass of solid yieldable electrically conducting material filling at least that portion of said tube the walls of which are to be sealed to said body, and a mass of metal forming a vacuum-tight seal between said conductor and said body.

2. In an article of manufacture, the combination of a ceramic body, an electrical conductor comprising a thin-walled metal tube passing through an opening in said body and a mass of solid yieldable electrically conducting material filling at least that portion of said tube the walls of which are to be sealed to said body, a thin layer of powdered refractory metal anchored in the ceramic side walls of the opening in said ceramic body, and a mass of solder bonding said metal tube with said layer of refractory metal and forming a vacuum-tight seal between said conductor and said ceramic body.

3. In an article of manufacture, the combination of a ceramic body, an electrical conductor comprising a thin-walled flexible tube formed of iron-nickel alloy passing through an opening in said body and a mass of solid yieldable electrically conducting material filling at least that portion of said tube the walls of which are to be sealed to said body, a thin layer of powdered tungsten adhesively held in the ceramic side walls of the opening in said ceramic body, and a mass of solder uniting said metal tube with said tungsten layer and sealing said conductor to said body.

4. In an article of manufacture, the combination of a ceramic body, an electrical conductor comprising a thin-walled flexible metal tube passing through an opening in said body, a mass of solid yieldable metal filling at least that portion of said tube the walls of which are to be sealed to said body and metallic plugs sealing the openings of said tube, said plugs having coextensive constricted inwardly directed extensions rigidly held by said yieldable metal, and a mass of metal forming a vacuum-tight seal between said conductor and said body.

HANS PULFRICH.

---

CERTIFICATE OF CORRECTION.

Patent No. 2,163,408.  June 20, 1939.

HANS PULFRICH.

It is hereby certified that error appears in the printed specification of the above numbered patent requiring correction as follows: Page 2, second column, line 3, claim 1, for the words "a solid, a solid inorganic" read a solid inorganic; and that the said Letters Patent should be read with this correction therein that the same may conform to the record of the case in the Patent Office.

Signed and sealed this 1st day of August, A. D. 1939.

(Seal)
Henry Van Arsdale,
Acting Commissioner of Patents.